United States Patent
Kungl

(10) Patent No.: US 9,823,552 B2
(45) Date of Patent: Nov. 21, 2017

(54) LENS AND SENSOR ATTACHMENT FOR A DIGITAL CAMERA AND RELATED RETROFIT KIT AND RETROFIT METHOD

(71) Applicant: Back-Bone Gear Inc., Ottawa (CA)

(72) Inventor: Helmut Kungl, Ottawa (CA)

(73) Assignee: Back Bone Gear Inc., Ottawa, Ontario (CA)

( * ) Notice: Subject to any disclaimer, the term of this patent is extended or adjusted under 35 U.S.C. 154(b) by 0 days.

(21) Appl. No.: 15/102,331

(22) PCT Filed: Dec. 4, 2014

(86) PCT No.: PCT/CA2014/051168
§ 371 (c)(1),
(2) Date: Jun. 7, 2016

(87) PCT Pub. No.: WO2015/089651
PCT Pub. Date: Jun. 25, 2015

(65) Prior Publication Data
US 2016/0349601 A1    Dec. 1, 2016

Related U.S. Application Data

(60) Provisional application No. 61/919,237, filed on Dec. 20, 2013.

(51) Int. Cl.
*G03B 17/56* (2006.01)
*H04N 5/232* (2006.01)
(Continued)

(52) U.S. Cl.
CPC ........... *G03B 17/566* (2013.01); *G03B 17/02* (2013.01); *G03B 17/14* (2013.01); *G03B 17/568* (2013.01);
(Continued)

(58) Field of Classification Search
CPC .. H04N 5/2251; H04N 5/2252; H04N 5/2254; H04N 5/23209; G03B 17/02;
(Continued)

(56) References Cited

U.S. PATENT DOCUMENTS

2002/0130963 A1    9/2002  Gelbard
2005/0212949 A1    9/2005  Tokiwa et al.
(Continued)

OTHER PUBLICATIONS

Havlik, Dan, "The Camera Bag: Novo Camera is a GoPro Hero3 Hacked to Take Cinema Lenses", Retrieved at: <<http://www.imaging-resource.com/news/2013/04/12/the-camera-bag-novo-camera-is-a-gopro-hero3-hacked-to-take-cinema-lenses>>, Retrieved Date: Jun. 7, 2016, Imaging Resource, Apr. 12, 2013, 4 pages.

*Primary Examiner* — Paul Berardesca
(74) *Attorney, Agent, or Firm* — Lorri W. Cooper; Medley, Behrens & Lewis LLC

(57) ABSTRACT

The invention relates to a kit for converting a digital camera to mount interchangeable lenses. The kit includes a front plate assembly configured to mount to an existing camera housing to replace the front cover of the camera body. The front plate assembly secures a digital image sensor and allows electrical connectors to be routed from the sensor into the camera body. The assembly includes a lens mount for releasably mounting an interchangeable camera lens, configured to mount at least one type of interchangeable camera lens and to position the camera lens to focus an image from the camera lens on the image sensor. The invention further relates to a method for retrofitting a non-interchangeable digital camera to mount interchangeable lenses by replacing the front plate of the camera body, and to an assembly that secures an image sensor to an interchangeable camera lens to focus the camera image on the sensor, for electrical connection with image processing and storage components.

23 Claims, 18 Drawing Sheets

(51) Int. Cl.
    *H04N 5/225*     (2006.01)
    *G03B 17/02*     (2006.01)
    *G03B 17/14*     (2006.01)

(52) U.S. Cl.
    CPC ......... *H04N 5/2253* (2013.01); *H04N 5/2254* (2013.01); *H04N 5/23209* (2013.01)

(58) Field of Classification Search
    CPC ...... G03B 17/12; G03B 17/14; G03B 17/565; G03B 17/566; G03B 17/568
    See application file for complete search history.

(56) References Cited

U.S. PATENT DOCUMENTS

| | | |
|---|---|---|
| 2009/0051806 A1 | 2/2009 | Haubmann |
| 2013/0128105 A1 | 5/2013 | Nunnink |
| 2015/0156380 A1* | 6/2015 | Volfson ................ G03B 17/566 348/373 |

\* cited by examiner

LENS AND SENSOR ATTACHMENT FOR A DIGITAL CAMERA AND RELATED RETROFIT KIT AND RETROFIT METHOD

This application claims priority based on U.S. Patent Application No. 61/919,237 entitled "KIT FOR CONVERTING A DIGITAL CAMERA TO AN INTERCHANGEABLE LENS CAMERA" filed Dec. 20, 2013, which is herein incorporated by reference.

FIELD OF THE INVENTION

The invention relates to digital cameras, specifically retrofit kits and components for mounting lenses to digital cameras. The invention further relates to a digital camera sensor assembly for mounting to a lens or other optical component.

BACKGROUND OF THE INVENTION

The majority of consumer digital cameras, including such popular makes as GoPro™, include a permanently mounted lens that is non-interchangeable. The exceptions typically include costlier and bulkier SLR cameras that permit interchangeable lenses. Several non-SLR cameras also have interchangeable lenses, but these are relatively few in number and do not provide wide consumer choice. Furthermore, existing interchangeable lens cameras are usually specific for a single type of lens mount: many manufactures provide a unique lens mount configuration or use a standard mount configuration such as M12, C, or CS. A number of lens mount configurations are available, some of which are unique to specific manufacturers and others of which are non-specific to individual manufacturers. Lens mount types generally are characterized by both a specific mounting configuration for mounting the lens to the camera body and also a specific mounting flange distance to properly space the lens from the sensor to focus the image on the sensor. While lens converter kits for using different lens with different lens mounts exist (i.e. allowing one to use a specific lens type with a different mount on another camera body e.g. a Nikon™ lens on a Canon™ body), use of these is not always workable in existing cameras due to focal distance issues that can arise when using these lens converters.

Many photographers prefer the flexibility of interchangeable lenses but face difficulties in matching their preferred lenses with selected camera bodies. As well, some existing non-interchangeable lens cameras provide desirable features and qualities that would benefit from the ability to interchange lenses. For example, miniature cameras, particularly miniature video cameras that can easily be worn by the user, are increasing in popularity. One example is the popular GoPro camera that permits the user to capture high resolution still or video images with a small camera body that can easily be mounted to athletic equipment such as a helmet. However, most small cameras of this type typically have non-interchangeable lenses and furthermore the lens provided with such cameras is, in some cases, a fixed focal length, wide angle lens or fish-eye lenses with high distortion which has relatively limited application, particularly for serious photographers.

Furthermore, many photographers have accumulated collections of high quality lenses they may have been acquired when owning previous cameras. Such owners would appreciate the ability to use such lenses on a modern digital camera or otherwise being able to use such lenses for digital photography.

One previous effort to retrofit a fixed non-interchangeable lens digital video camera for use with interchangeable lenses is the View Factor™ system, which consists of a modified GoPro Hero 3™ camera which accepts C-mount lenses. This system consists essentially of a rebuilt GoPro camera including a unique circuit board and software. The front face of that camera is provided with a mount that accepts interchangeable lenses using the standard C-mount. This solution has proven to be relatively complex and costly to fabricate.

SUMMARY OF THE INVENTION

It has been discovered that an approach to retrofitting a digital camera to accept interchangeable lenses is to remove the front plate, lens and image sensor assembly from the camera body and replace this with a new front plate assembly, in which an image sensor (which may be the original camera image sensor or a new image sensor) is mounted on or within the front plate. The assembly includes a mount for interchangeable lenses and is configured whereby the image from the lens is focussed on the sensor. The mount protrudes outwardly to permit the lens to focus on the sensor. By relocating the sensor to the front plate assembly and extending the camera lens outwardly with a protruding mount, a simple and convenient means to retrofit the camera is obtained. An electrical connector is provided to transmit signals from the image sensor into the camera body for processing by the camera electronics.

According to one aspect, the invention relates to a kit for converting a selected non-interchangeable lens digital camera to mount interchangeable camera lenses, said camera comprising a camera body comprising a housing, a removable front cover, an image processing system for electronically processing and storing digital photographic images from a digital sensor and a power source. The kit comprises a front plate assembly configured to mount to the housing to replace the existing front cover of the camera body. The front plate assembly is configured to retain a digital image sensor and to permit electrical connectors from the image sensor to be routed to the interior of the camera body for the transmission of electrical signals from the image sensor to said image processing electronic components. The kit further includes a lens mount for releasably mounting an interchangeable camera lens to the front plate assembly. The lens mount is configured to position the camera lens to focus an image from the lens onto the image sensor. The lens mount may be configured to mount at least one type of interchangeable lens to the front plate assembly. The front plate assembly may be configured to retain the digital image sensor in a position which is substantially flush or slightly recessed from the exterior surface of the assembly.

The lens mount may comprise a flange protruding from the front plate assembly configured to mate with a lens. The flange may include an anti-rotation member to prevent rotation of the lens on the flange to secure the lens to the flange at a selected position on the flange. The lens mount may comprise a first mounting member to mount a first selected lens type to the front plate assembly, a first adapter configured to mount to the first mounting member and to a second selected lens type and optionally a second adapter adapted to mount to the first adapter and to a third selected lens type. The first, second and third lens types comprise different lens mounts, such as M12, C and CS mounts.

The front plate assembly may comprise separate base plate cover plates. A recess is provided between the base and cover plates to retain the digital image sensor. The plates are separable to secure the sensor within the recess. One or more additional recesses may be provided between the plates for retaining additional camera components such as a digital image display, a power control member or a light-emitting member.

An electrical connector may be provided, which is configured to extend from the image sensor at one end thereof to the image processing electronic components within the camera body, at a second end thereof. The front plate assembly may have an opening to permit the connector to pass between the image sensor and the electronic components.

The front plate assembly may be configured to cover a front portion of the camera body when installed thereto wherein the sides and back surfaces of the camera body are uncovered.

The invention further relates to a method for converting a digital camera having a non-interchangeable lens into an interchangeable lens camera, in which the digital camera has a body comprising a face plate, a lens and an image sensor. The method comprises:

removing the face plate, lens and image sensor from the camera body;

securing a front plate assembly to the camera body wherein the front plate assembly comprises a digital image sensor and a lens mount for releasably mounting an interchangeable camera lens to said front plate assembly. The lens mount is configured to mount at least one type of camera lens, wherein the lens mount is configured to position the camera lens to focus an image from the lens on the image sensor;

routing electrical connectors from the digital image sensor to the interior of the camera body for transmitting electrical signals from the image sensor to the electronic components, and connecting said electrical connectors to digital image processing components of said camera.

The front plate assembly for the method may comprise the aspects described above.

The invention further relates to an assembly for attaching to a camera lens to digitally capture images. In this aspect, the assembly comprises:

a digital image sensor;

a support comprising a surface having a recess therein configured to secure the digital image sensor within the recess in a position whereby an image from the camera lens is focused on the sensor and the sensor is flush with the surface or slightly recessed therefrom;

an electrical connector to transmit electrical signals from the image sensor to an electronic circuit for processing of said signals into a stored digital image and optionally controlling said image sensor; and a lens mount for attachment to the support and configured to releasably mount the camera lens to said lens mount, said lens mount configured to mount least one type of camera lens, wherein, the lens mount is configured to position the camera lens to focus an image from the lens on the image sensor.

The support may be configured to include the elements and aspects described above in connection with the front plate assembly of the kit described above.

The method may comprise use of the kit described above to retrofit a digital camera having a non-interchangeable lens to accept interchangeable lenses.

Definitions

The following terms shall have the meanings described below in this patent specification:

"image sensor" refers to an electronic component for capturing images and converting these into digital electronic signals. Examples include CMOS or CCD image sensor.

"Flange Distance" is the front-to-rear spacing provided by a lens mounting flange for spacing the lens from the image sensor by a distance that focuses the image from the lens onto the sensor.

DETAILED DESCRIPTION

Figure 1:
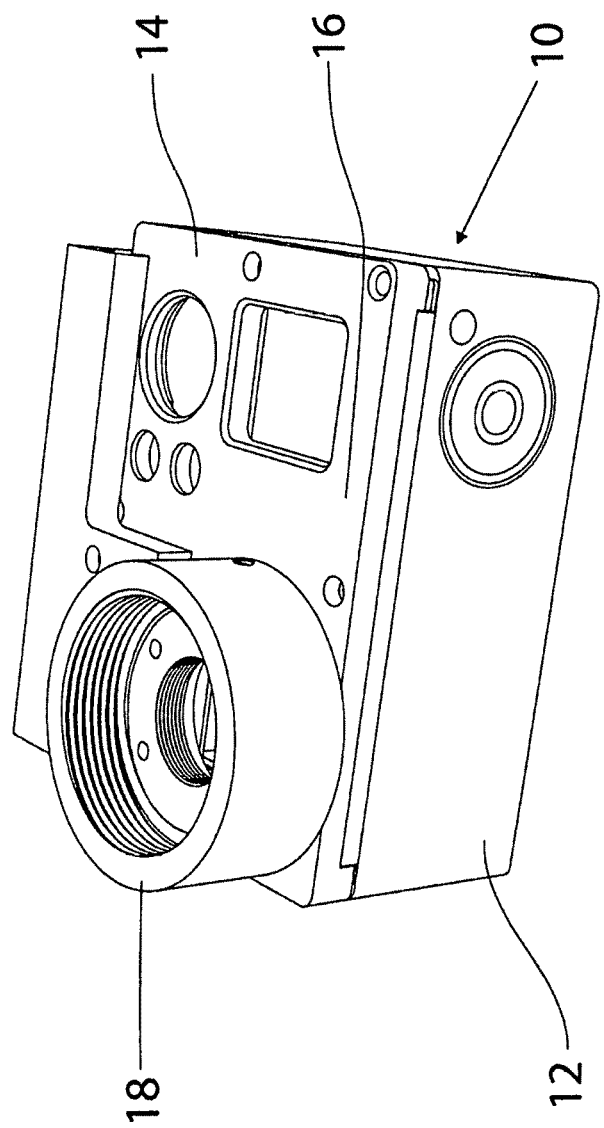
FIG. 1 is a perspective view of an assembled camera and retrofit system according to the present invention.

Turning to the Figures, FIG. 1 is a perspective view of a digital camera 10 retrofitted with a retrofit kit 14 according to the present invention which allows camera 10 to mount interchangeable lenses. Camera 10 normally comprises a conventional non-interchangeable lens camera such as a GoPro camera. As seen in exploded view in FIGS. 12A-E, prior to installation of kit 14, camera 10 comprises a camera housing 12 which houses an electronic digital image processing system, including an image sensor 22. Camera 10 also comprises a conventional non-interchangeable lens 5 which is fastened to housing 12 in a fashion that does not allow for user-interchangeability. Camera 10 is configured to focus an image from its lens onto the image sensor. Kit 14 comprises in general terms a front plate assembly 16 and a lens mount assembly 18. Front plate assembly 16 comprises a rigid material such as aluminum, stainless steel or plastic which is configured to replace the original face plate 2 of digital camera 10.

Components of a conventional digital camera 10 are shown in a disassembled state in FIGS. 12A-F. For purposes of illustration, a GoPro digital video camera is shown. Camera housing 12, seen in FIG. 12A, comprises a rectangular moulded plastic structure having an open front. The original face plate 2, shown in FIG. 12B, is secured to housing 12 and is configured to cover the open front of housing 12. FIG. 12C shows an image sensor assembly 61 including a digital image sensor 22, and image sensor circuit board 59 and a flexible ribbon connector 62 for connecting image sensor 22 to PCB (printed circuit board) plate 20, which is shown in FIG. 12D. The camera lens assembly 4 is shown in FIG. 12E, and consists of a fixed-focus lens 5, a lens protection/lens hood flange 6 and a lens support plate 7. Lens 5 comprises a lens barrel 8, which fits within a slot ii within PCB plate 20. A sensor mount 9 is attached to an end of lens barrel 8 for mounting an image sensor 22, such as a CMOS sensor. Lens assembly 4 is attached to an LCD/LED assembly 66, described below. FIG. 12F shows LCD/LED assembly 66 which is normally secured to lens assembly 4 and is described in more detail below.

Figure 2:
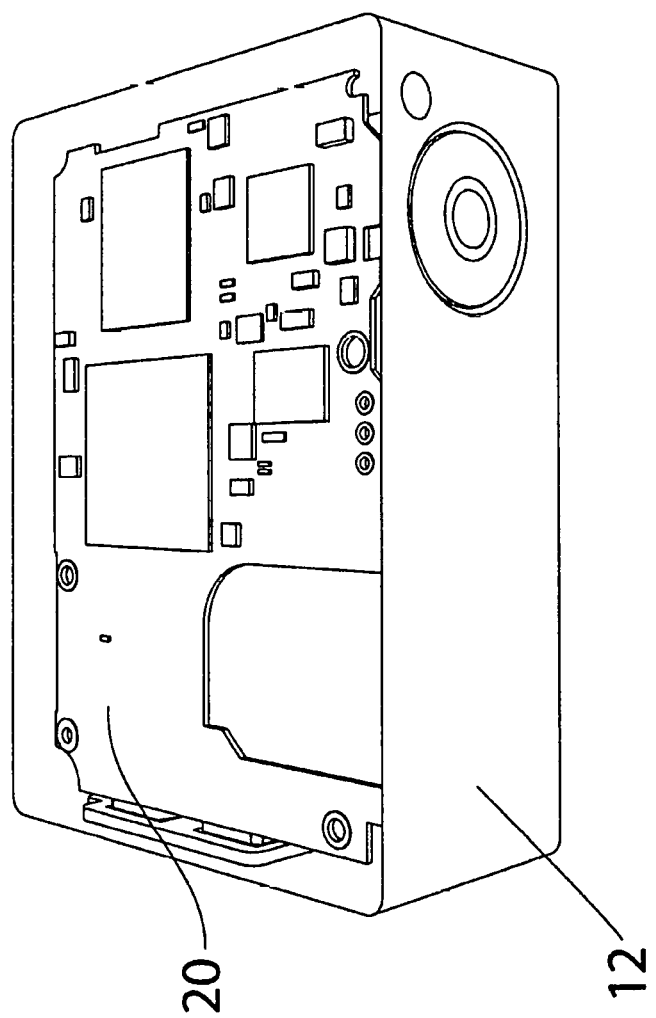
FIG. 2 is a perspective view of the camera body, with the front plate removed, with image processing circuit board in place, prior to mounting a retrofit kit.

Turning to FIG. 2, installation of kit 14 initially involves removal of the original face plate 2 (see FIG. 12B) from camera housing 12 to reveal PCB plate 20 within the interior of housing 12. Normally, this is performed by removing screws which secure the face plate to the housing. PCB plate 20 comprises conventional electronic components and circuit elements mounted and etched thereon for processing images from image sensor 22 (not shown in FIG. 2). Images captured by image sensor 22 are converted into a format suitable for storage in the camera memory and retrieval as still or video images. PCB plate 20 includes such components as digital image processing components as well as components for changing camera settings (such as shutter speed, light sensitivity and other settings), image manipulation and other functions for operation of the camera. Image storage is normally provided by a removable memory chip, not shown, retained in a memory chip compartment mounted to PCB plate 20. PCB plate 20 further comprises an image processing circuit for transmitting the camera image to a viewer, normally on the back side of the camera, not shown. PCB plate 20 is secured within housing 12 by screws or the like, which are removed to temporarily remove PCB plate 20.

Figure 3:
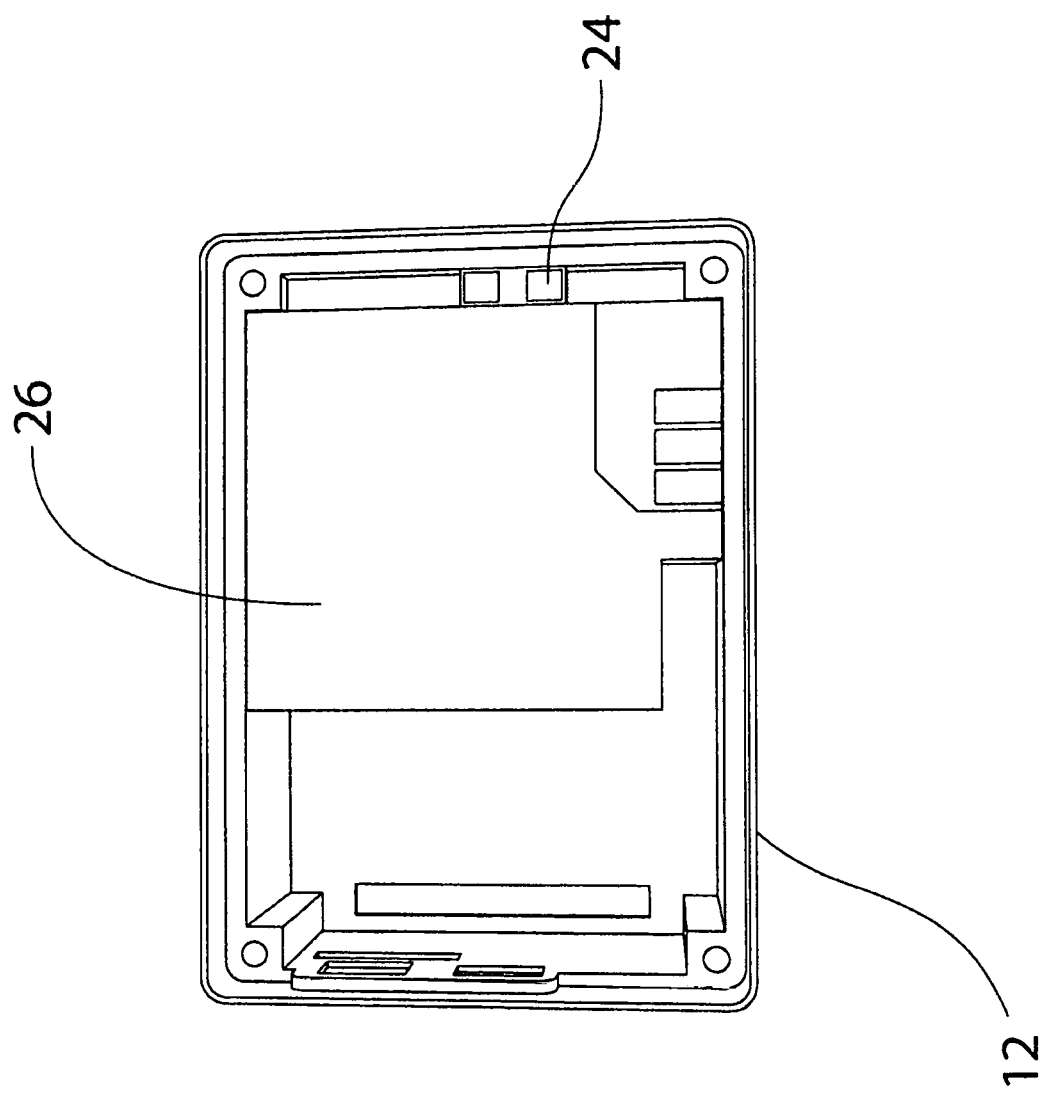
FIG. 3 is a plan view from above of a digital camera body, with the circuit board removed, showing a deeper layer of internal components as compared to FIG. 2.
Figure 4:
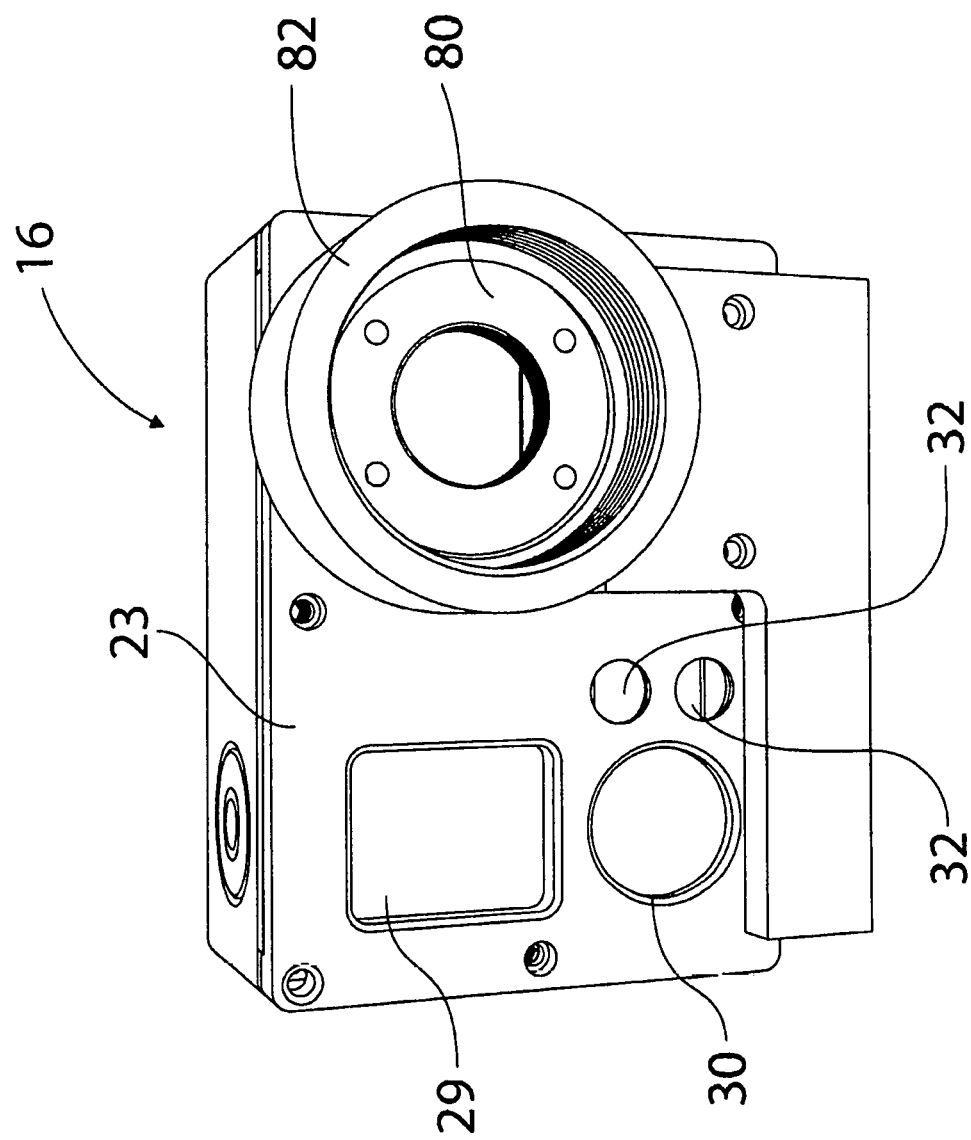
FIG. 4 is a perspective view of the front/cover plate component of the kit.
Figure 5:
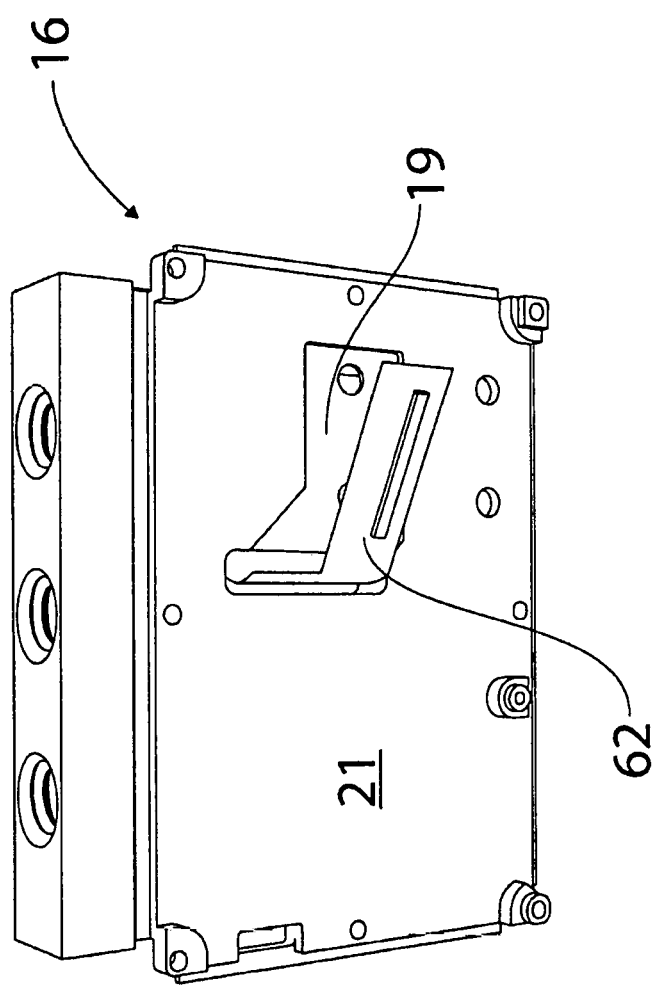
FIG. 5 is a perspective view showing the rear face of the base plate according to the invention.

FIG. 3 shows the interior of housing 12 with PCB plate 20 removed to show a battery assembly comprising electrical contacts 24 and rechargeable battery 26.

Turning to FIGS. 4-8 and 13, front plate assembly 16 comprises a base plate 21 and overlying cover plate 23. Base plate 21 is configured to be attached to camera housing 12 to cover the open front thereof. Cover plate 23, which has a similar configuration as base plate 21, overlies base plate 21 and is fastened thereto when assembled. The base and cover plates 21 and 23 form a sandwich-like structure when assembled that retains an image sensor and other components as described below. The base and cover plates 21 and 23 have an essentially rectangular configuration, configured to fully cover the front of camera housing 12. Their configuration is designed to generally match the configuration of camera housing 12 so as to permit front plate assembly 16 to be secured to camera housing 12 using the original mounting components such as mounting screws or other securing/fastening means. The configuration of front plate assembly 16 can essentially match the configuration of the original camera face plate 2 which is removed in order to mount front plate assembly 16.

As seen in FIGS. 6, 7, 13, and 18, base plate 21 comprises a first recess 25 set into the outer surface of plate 21 facing outwardly from camera housing 12 when mounted thereto. Recess 25 consists of a first rectangular region 27 with a flat floor configured to receive a portion of an LCD/LED assembly 66, described below, namely an LCD panel 68. Recess 25 further comprises a second rectangular region 28 adjacent to region 27, also having a flat floor, configured to receive an LED and on/off button portion of LCD/LED assembly 66. In embodiments, the length, width, and height of the base plate is 59, 41, and 5.52 mm, respectively.

Figure 6:
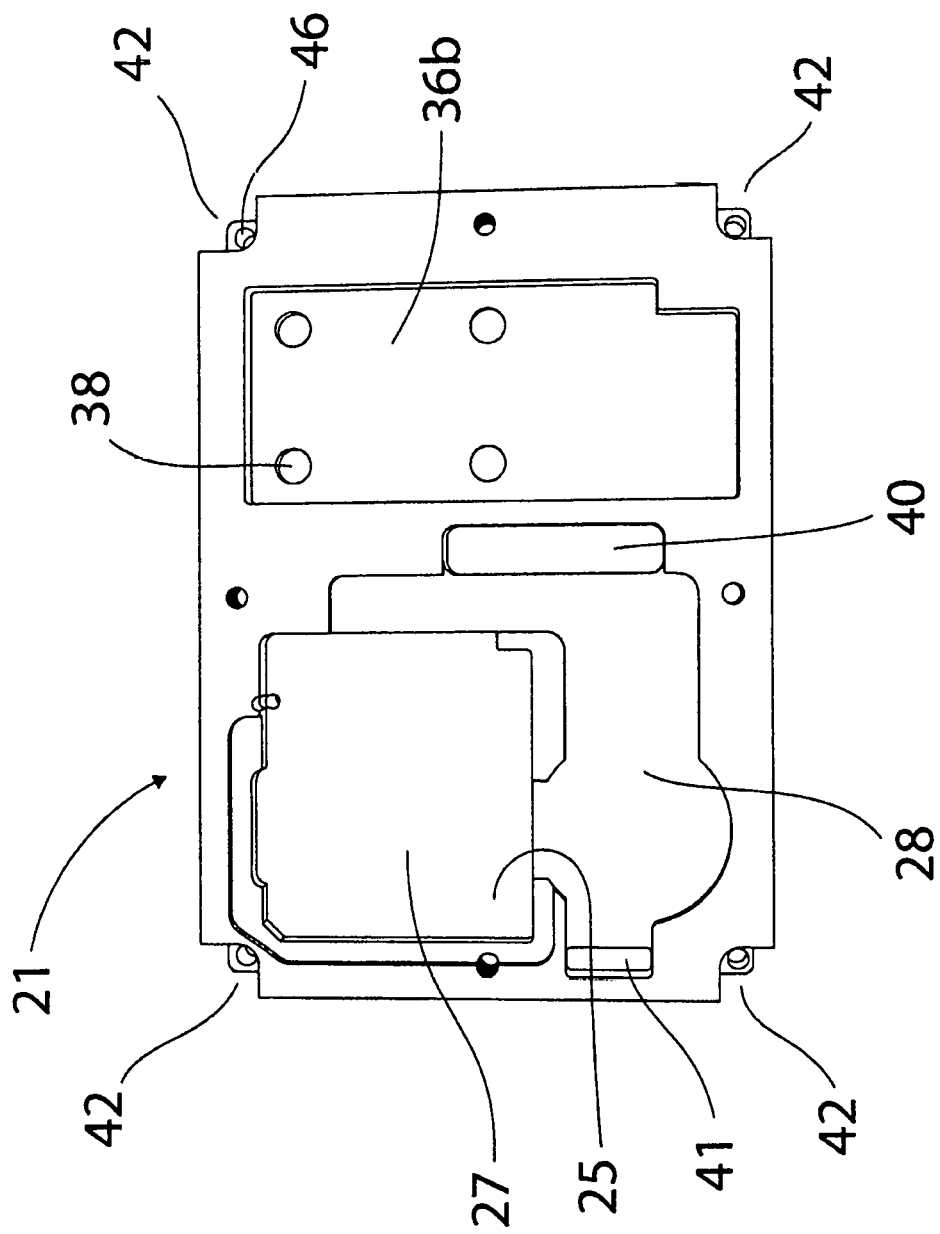
FIG. 6 is a perspective view of the base plate, from the front.
Figure 7:
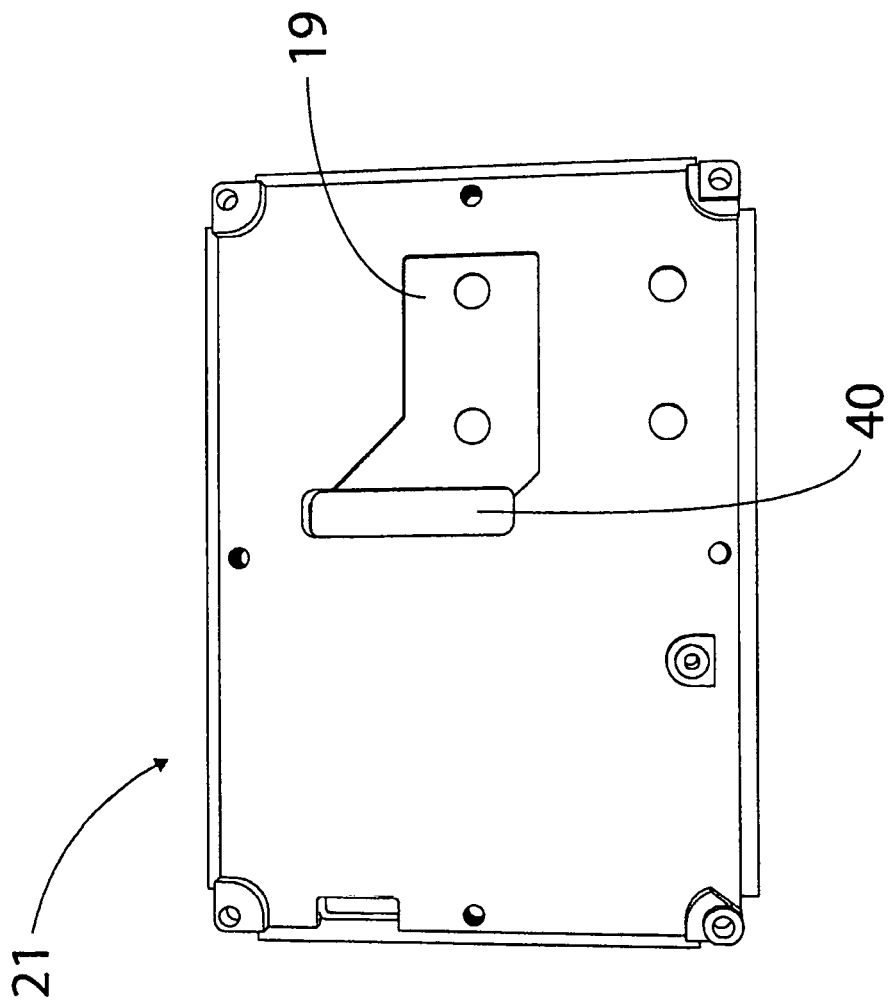
FIG. 7 is a perspective showing the base plate from the rear.

As best seen in FIG. 6, a second recess 36b is provided within base plate 21 to accommodate an image sensor 22, discussed below. Recess 36b opens outwardly to exterior of the assembled camera. Recess 36b has a flat floor and is located adjacent a side edge of base plate 21, opposed to recess 25. Small apertures 38 extend through base plate 21 opening into recess 36b to provide access to the underside of the image sensor 22 to secure image sensor 22 to the floor of recess 36b by screws or other fasteners or fastening means. A first slot 40 extends through base plate 21 adjacent to recess 36b to allow an electrical ribbon connector 62 from image sensor 22, described below, to pass through base plate 21 for extending into the exterior of camera housing 12. A second slot 41 is located adjacent to recess portion 28 to allow a ribbon connector 73 from LED/LCD assembly 66 to pass through plate 21. Cutaway regions 42 are located at each corner of base plate 21 to receive similar-shaped mounting pegs 44 which protrude from each corner of plate 23 to secure plates 21 and 23 together. Openings 46 are located within the floor of cutaways 42 to allow a screw or other fastening member to fasten plates 21 and 23 together.

A further recess 19 is provided on a side of base plate 21 opposed to recesses 25 and 36b. Recess 19 is configured to receive a portion of ribbon connector 62 when image sensor assembly 61 is positioned within front plate assembly 16.

Figure 8:
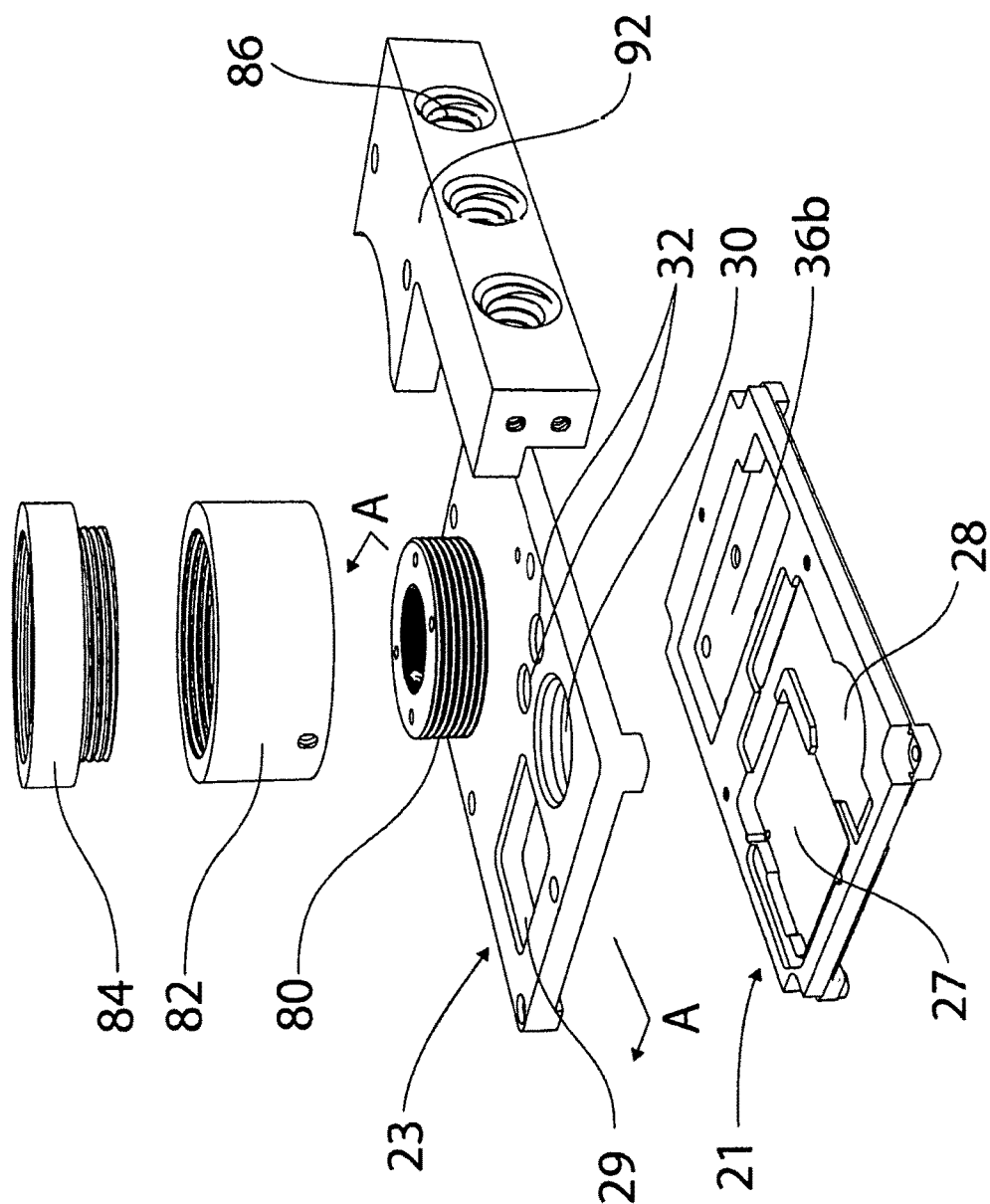
FIG. 8 is a perspective, exploded view of components of the present kit.
Figure 13:
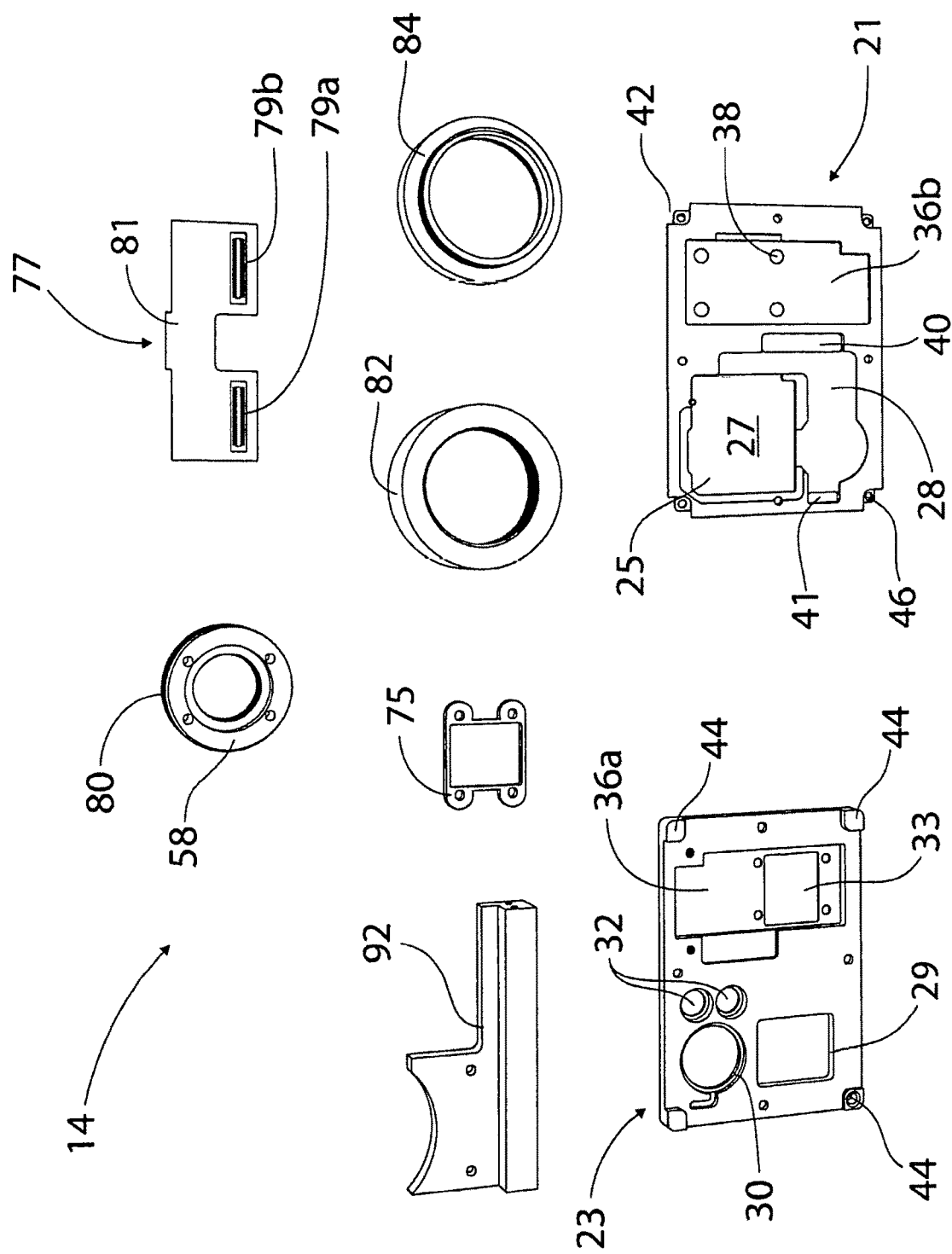
FIG. 13 is an exploded view, in perspective, of components of a camera kit according to the invention.
Figure 17:
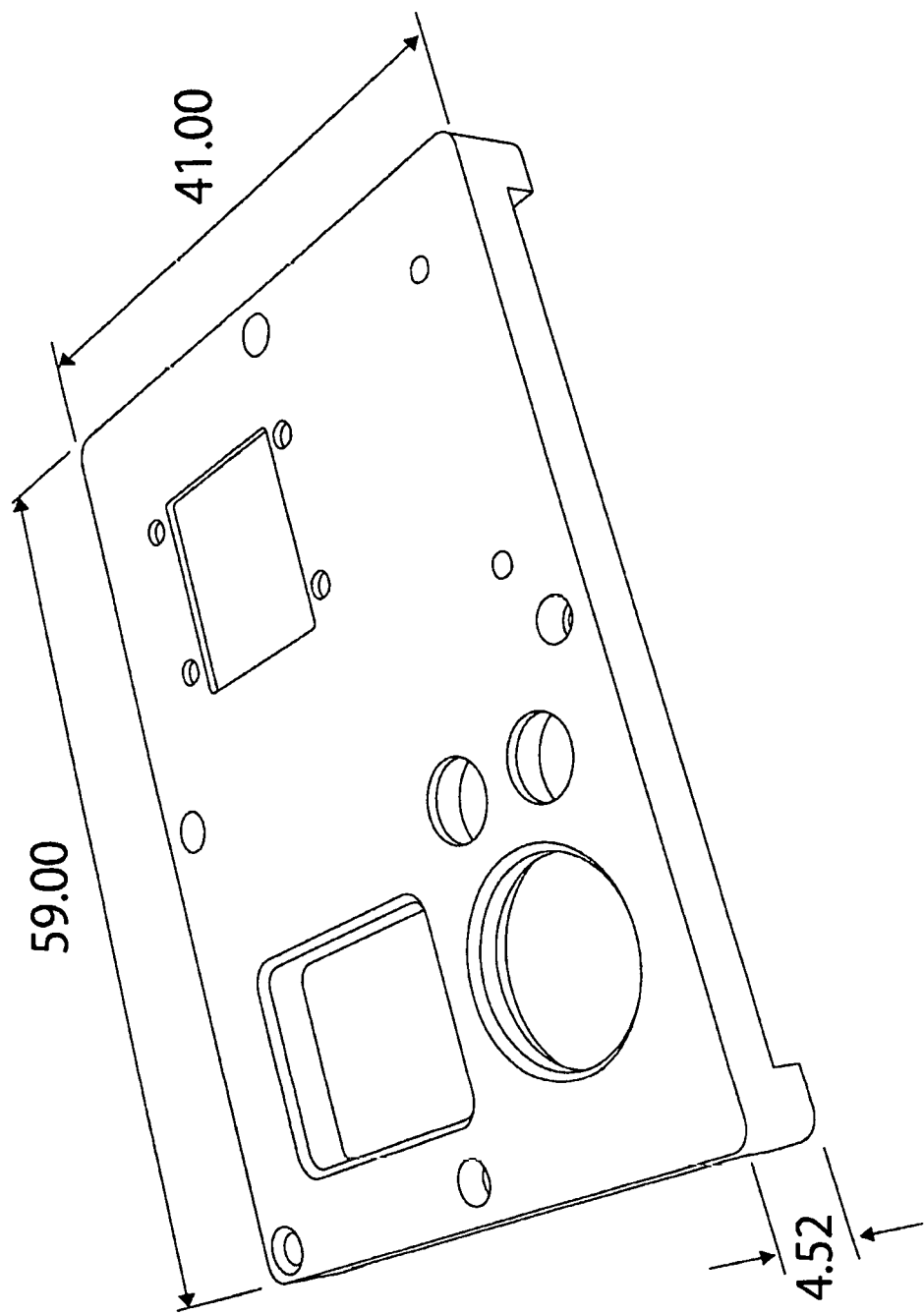
FIG. 17 is a perspective view of the cover plate, from the front.
Figure 18:
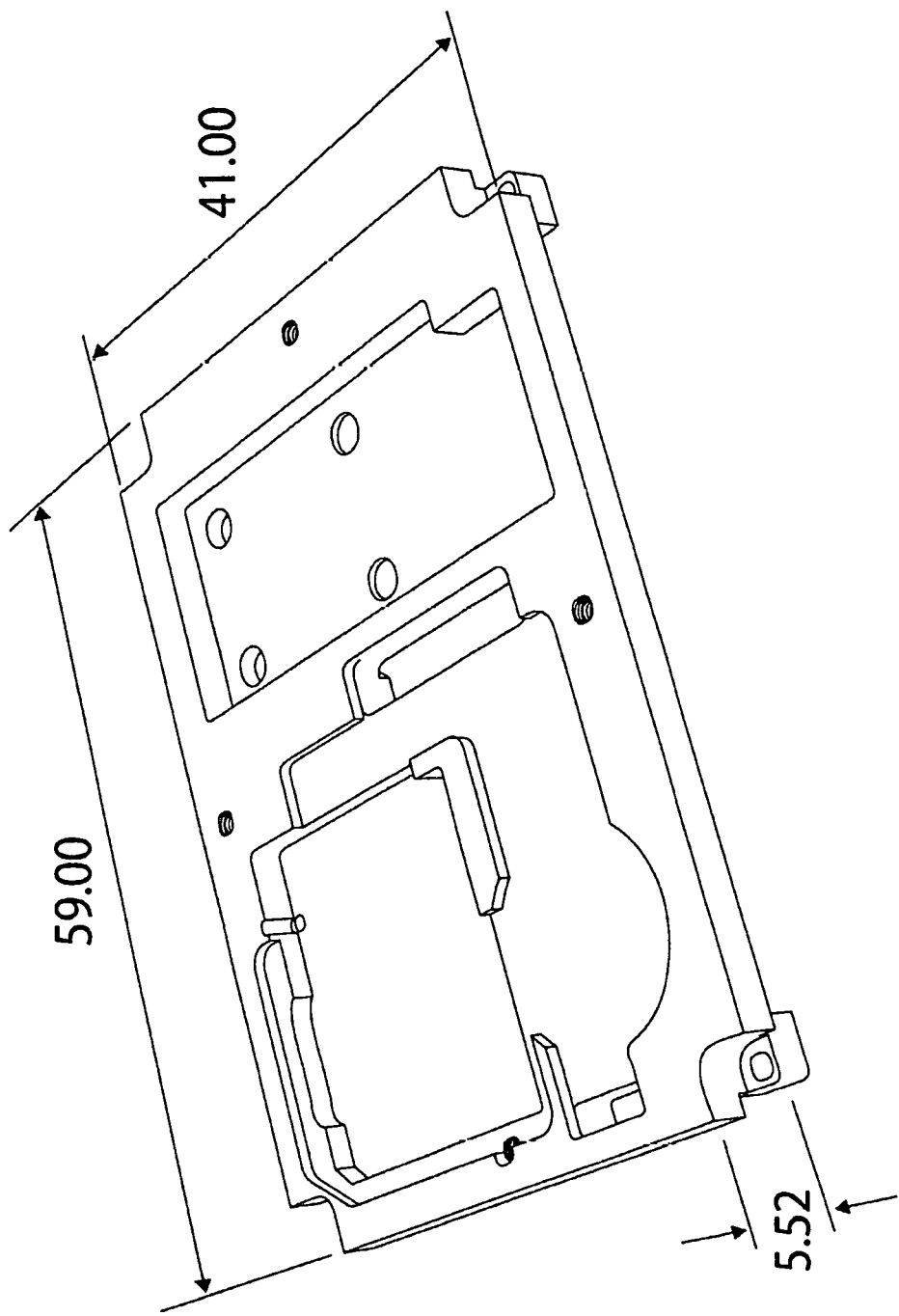
FIG. 18 is another perspective view of the base plate, from the front.

FIG. 13 shows an inside surface of cover plate 23, facing the interior of housing 12 when assembled thereto. As seen in FIGS. 8, 13, and 17, cover plate 23 has an essentially identical overall configuration to base plate 21 whereby the respective plates can be secured together one over the other in a sandwich-like configuration and the peripheral edges thereof are essentially aligned. The respective inside and outside surfaces of plates 21 and 23 are essentially flat for contact with each other when assembled. The assembled front plate assembly 16 thus has the appearance of a monolithic front plate. In embodiments, the length, width, and height of the cover plate is 59, 41, and 4.52 mm, respectively. Cover plate 23 has an opening 29 aligned with first recess portion 27 when assembled to permit viewable access to LCD panel 68. Cover plate 23 comprises through-openings 30 and 32 aligned with and open to the LED and on/off power button components of LCD/LED of assembly 66. A recess 36a within the inwardly-facing surface of plate 23 is configured to fit image sensor assembly 61. Opening 33 within plate 23 (seen in FIG. 13) is located within the floor of recess 36a and is open to image sensor 22, to permit image sensor 22 to communicate with a lens mounted on the exterior of front plate assembly 16.

Turning to the method for installing retrofit kit 14 on a camera, the initial step comprises removing the original face plate 2 from camera housing 12. Face plate 2 may be pried off and/or removed by removing any screws of other fastening members that secure it to housing 12. For the next stage, camera lens assembly 4, PCB plate 20 and sensor assembly 61 are temporarily removed from housing 12, normally as a single assembly. This assembly may be removed by unscrewing mounting screws and gently removing the assembly from housing 12. Housing 12, with the battery components left in, is set aside. The lens support plate 7 is then detached from PCB plate 20 by removing screws or other fasteners that hold these components together. This allows lens assembly 4 to be released from PCB plate 20, with the image sensor assembly 61 remaining attached to lens assembly 4. Image sensor assembly 61 is the electrically detached from PCB board 20 by detaching the multi-pin connector 63 of ribbon 62 from a corresponding connector on PCB plate 20. Image sensor assembly 61 is disconnected from sensor mount 9 of lens assembly 4 to separate these components, normally by unscrewing small fasteners that hold these together.

At this point, the original lens assembly 4 may be further disassembled to detach the original LCD/LED assembly 66 from support plate 7. Assembly 66 comprises an LCD display 68 that displays camera settings and other operational information, a power on/off switch 70 and LED's 72 that provide camera flash and other light emitting functions for operation of the camera. Assembly 66 is normally electrically connected to PCB plate 20 via a ribbon connector 73 that has a multi-pin electrical connector at the free end thereof which is configured to mate with a corresponding connector in plate 20. Normally, assembly 66 is secured to plate 7 by adhesive tape, which may be removed to allow disassembly.

The remaining components of the original lens assembly 4 and cover plate 2 are not used in the subsequent reassembly of the camera body and kit 14.

After disassembly of the camera components as described above, retrofit kit 14 may be installed onto a camera housing 12. The following describes one sequence of steps, although it will be seen that variations on this sequence may be followed. According to this sequence, the initial step in the reassembly is to apply double sided tape to a surface of ribbon connector 62 on a surface opposed to multi-pin connector 63. Ribbon connector 62 may have a metal stiffener plate at this location, in which case the tape is applied over this plate.

By reference to FIGS. 12,13,14 and 15, the image sensor assembly 61 is then fastened to front plate/cover plate 23 to form a first sub-assembly. A plastic standoff 75 (FIG. 13), which is configured as a thin plastic frame, is secured to image sensor assembly 61. Standoff 75 is configured whereby its central opening surrounds image sensor 22 leaving the image sensor 22 exposed. Standoff 75 spaces image sensor 22 from overlying cover plate 23 when assembled. Image sensor assembly 61 is then assembled to cover plate 23 such that image sensor 22 is exposed through opening 33 and standoff 75 is interposed between assembly 61 and the floor of recess 36a. A lens mount flange 80 is then placed against an opposing face of cover plate 23, and these components are then secured together with screws that extend through image sensor assembly 22, standoff 75, cover plate 23 and lens mount flange 80.

Image sensor 22 is retained within recesses 36a and 36b in a position that allows for precision focusing of an optical image from a lens. For this purpose, the depth of recesses 36a and 36b and thickness of all components of kit 14 should be carefully controlled and fabricated with precision.

The front plate sub-assembly may then be assembled to base plate 21. The electrical ribbon connector 62 of image sensor assembly 61 is inserted through slot 40, to allow an end of ribbon connector 62 to be subsequently folded over onto the opposing side of base plate 21. Following this, image sensor assembly 61 may then be positioned within recess 36b of base plate 21, where it is snugly retained by a friction fit pending further assembly steps. Ribbon connector 62 is then folded back to contact the opposed side of base plate 21 where it is fitted within recess 19. The double-sided tape previously applied to ribbon connector 62 is exposed to secure ribbon connector 62 into recess 19.

LCD/LED assembly 66 can then be positioned on base plate 21 within recess 25, such that LCD panel 68 fits within recess portion 27 and the button 70 and LED portions of assembly 66 fit within recess portion 28. Ribbon connector 73 is fed through slot 41 of base plate 21. The power button 70 and LCD cover plates from the original camera may be removed from the original camera face plate and placed within apertures 30 and 32 respectively of plate 23, to cover power button 70 and LED's 72. The multi-pin electrical connector at the free end of ribbon connector 73 can be connected to the corresponding connector on PCB plate 20 at a subsequent step.

Cover plate 23 is then secured to base plate 21 by screws or other fasteners, thereby sandwiching the image sensor assembly 61 and the LCD/LED 66 and holding these elements securely in place within front plate assembly 16. Image sensor 22 is exposed through opening 29 of plate 23, while LED button 70 is exposed through opening 30 and LED's 72 are visible through openings 32 in cover plate 23.

Sensor assembly 61 is then electrically connected to PCB plate 20. For this purpose, a flexible connector strip 77 is provided having male and female multi-pin connectors 79a and 79b at respective ends thereof for connecting image sensor assembly 61 to PCB plate 20. The male connector 79a is connected to the female multi-pin connector 63 of image sensor assembly 61, which by this point has been secured to the backside of plate 21 opposed to image sensor 22 within recess 19, by gently pressing the respective multi-pin connectors 79a and 63 together. Optionally, double sided tape on flexible connector strip 77 secures this to PCB plate 20 when pressed together. Flexible connector strip 77 is configured to extend through opening 11 in PCB plate 20 to allow the exposed connector 79b to reach the back side of plate 20 opposed to assembly 16. For this purpose, flexible connector strip 77 has a generally yoke-shaped configuration with a flexible middle region 81 that allows the strip 77 to be positioned against PCB plate 20 with connector 79b in contact with the corresponding connector of PCB plate 20. Connector 79b is then electrically connected to the corresponding multi-pin connector of plate 20 by gently pressing these together to electrically connect image sensor assembly 61 to the electronic circuit of PCB plate 20.

Front plate assembly 16, with the PCB plate 20 attached thereto, may then be attached camera housing 12. PCB plate 20 includes battery contacts configured to make electrical contact with corresponding contacts on the camera battery assembly when assembly 16 is assembled with housing 12.

The assembled camera includes a tubular lens mount flange 80, shown in detail in FIGS. 8, 9, 11, 14 and 15. Lens mount flange 80 is externally threaded with external threads 50 and configured to mount an M12 lens. It will be seen that flange 80 projects from the front face of the front plate assembly 16 and permits a user to screw a lens thereto. Kit 14 is configured whereby when a conventional M12 lens is secured to flange 80, it will focus on the surface of image sensor 20. For this purpose, the distance "h", also known as the flange distance (seen in FIG. 15), between inner and outer surfaces 56 and 58, respectively of flange 80 is selected to provide a spacing between an M12 lens mounted thereto and image sensor 20 for focusing on image sensor 20. This spacing is determined by the configuration of the lens elements and will vary with different lens types. It is also evident that flange 80 may comprise any one of a variety of lens mounts, such as threaded, bayonet or otherwise. For mounting such different lens types, a different configuration of flange 80 may be provided with a different distance "h".

Figure 9:
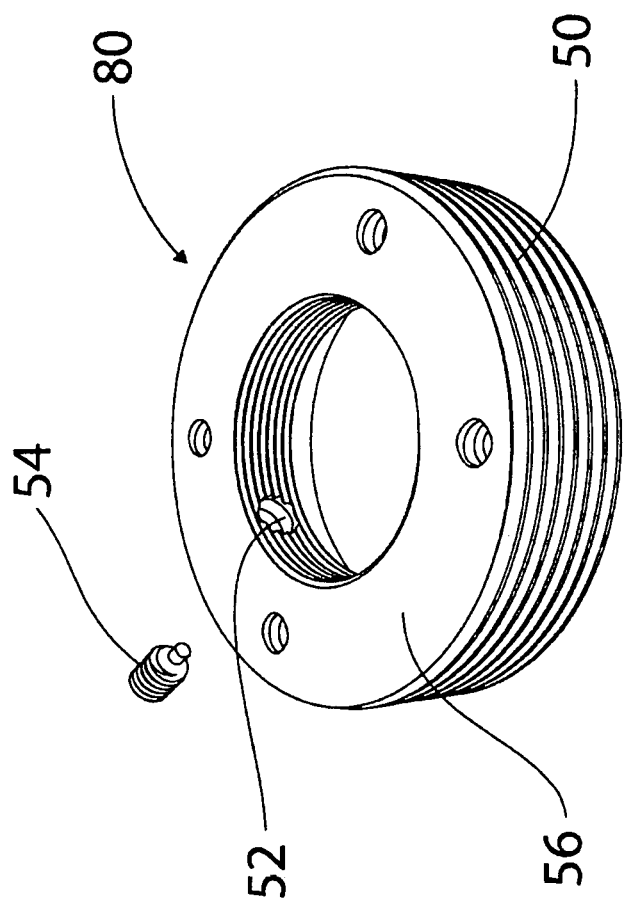
FIG. 9 is a perspective view of a lens mount flange for an M-type lens.
Figure 11:
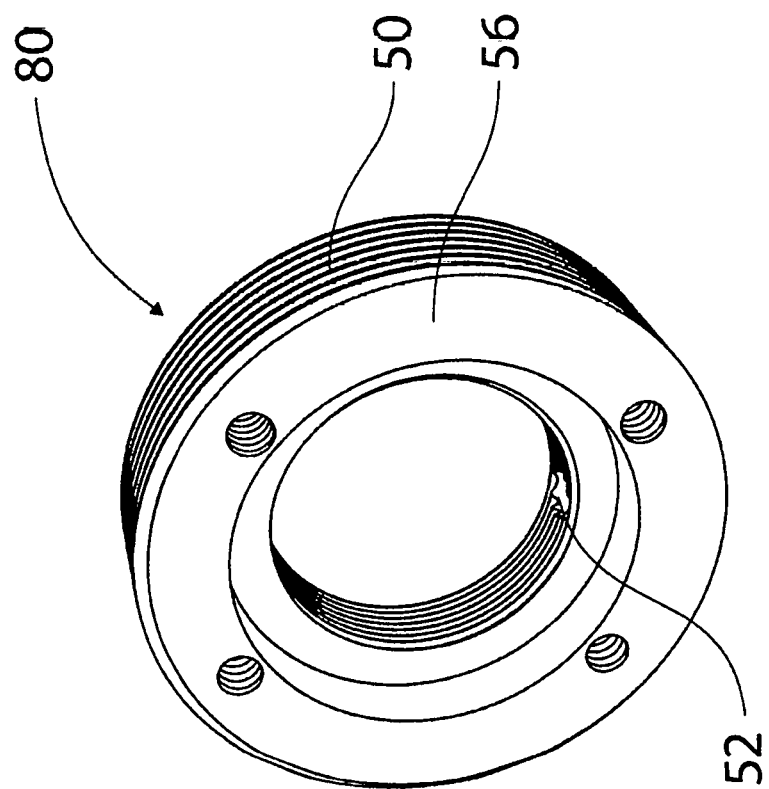
FIG. 11 is a further perspective view of an M-mount flange.
Figure 12:
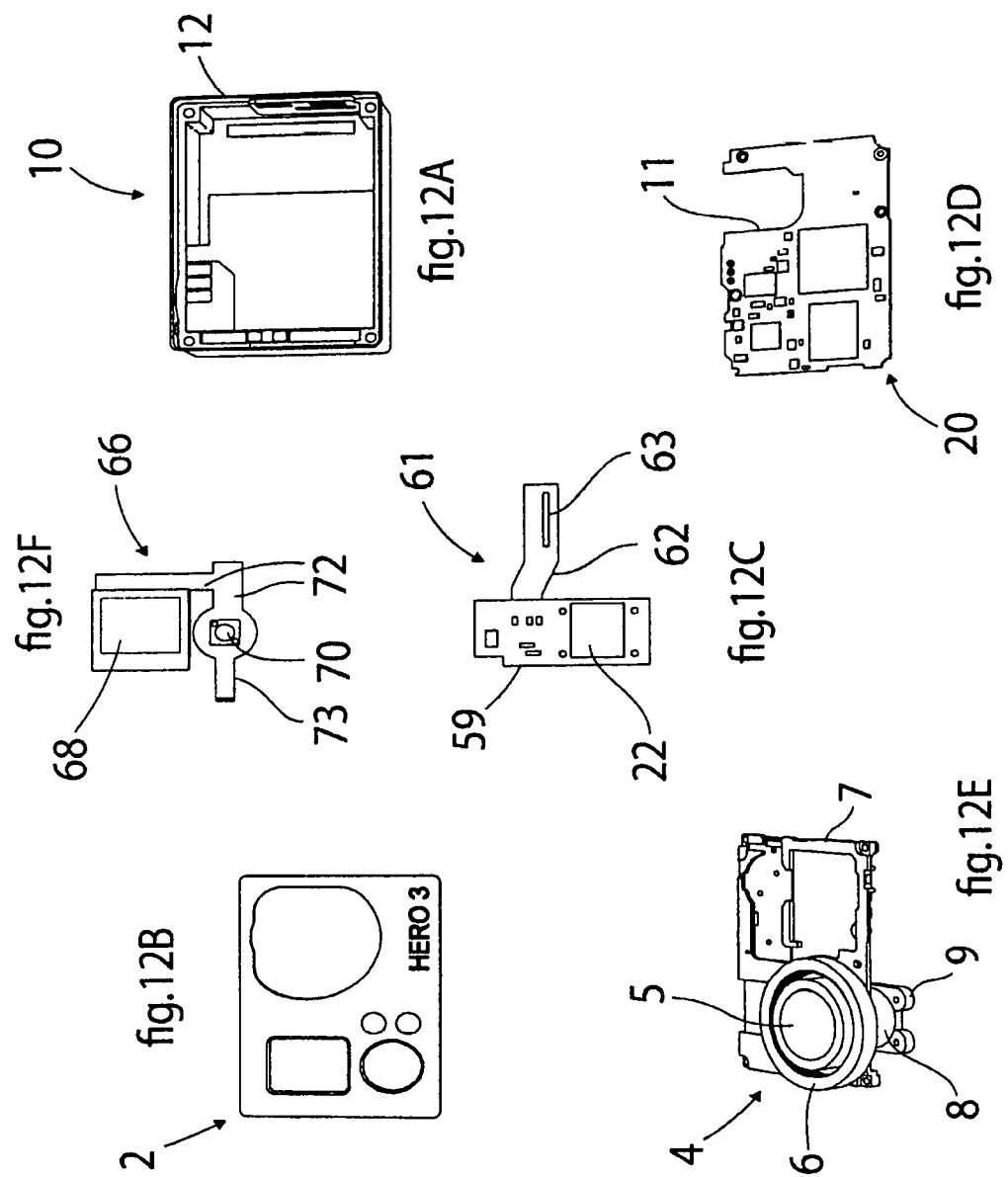
FIGS. 12A, 12B, 12C, 12D, 12E and 12F are perspective views of components of a conventional digital camera, disassembled prior to installation of a retrofit kit according to the invention.

As best seen in FIGS. 9 and 11, lens mount flange 80 includes a lock to provide precision adjustment of the spacing between a lens threaded thereto relative to image sensor 20. The lock consists of a set screw 54 that is received within threaded opening 52, that opens laterally so that the screw can contact a threaded surface of the lens. Set screw 54 is backed off during assembly of the lens onto flange 80 and fine adjustment of the focus by threading the lens to a precise position on flange 80. When the lens is precisely in position, the set screw 54 is tightened against the lens to lock it into position.

According to an embodiment, for an M12 lens, the flange distance is adjusted by turning the lens until it focuses properly on the image sensor 22. Since M12 lenses have different flange distances, this is done by turning the M12 lens in the M12 ring while viewing the output on a monitor. Once the image is considered sharp, then the set screw 54 is used to lock the lens in place.

The flange distance for all other lenses is set by the CS-Ring and C-Ring. For instance, the CS-Ring is 12.5 mm from the image sensor 22 and the C-Ring is a 5 mm spacer extends the flange distance to 17.5 mm. Any lens, such as for example, a Nikon 50 mm could then be attached using a Nikon to C or CS adapter. It will be appreciated that the adapter then sets the proper flange distance because the attachment flange distance is known and the adapter adjusts for the difference.

Figure 16:
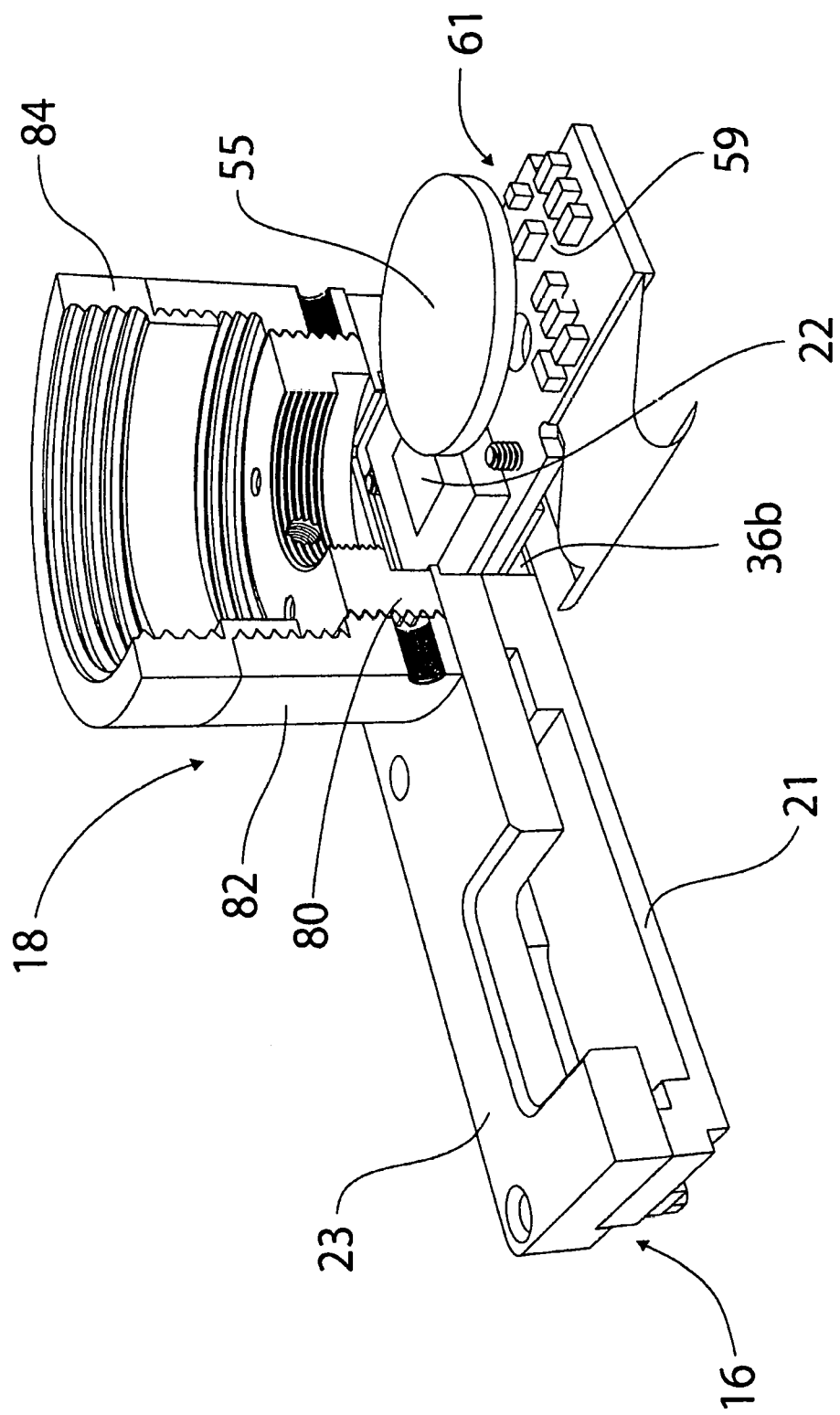
FIG. 16 is a perspective cross sectional view of the lens mount assembly mounted to the front plate assembly sectioned along the line A-A shown in FIG. 8, and shown additionally with the image sensor assembly oriented in an operative position and with an optional IR cut filter moveable into an operative position in front of the image sensor.

As seen in FIG. 16, optionally, an infrared (IR) cut filter 55 may be interposed between M12 mount flange 80 and cover plate 23. In use, removal of IR cut filter permits increased sensitivity to IR light, thereby allowing night time use of the camera. Optionally, IR cut filter 55 may be fastened to an exposed surface to flange 80 to permit easy attachment or detachment for use in different light conditions.

Figure 10:
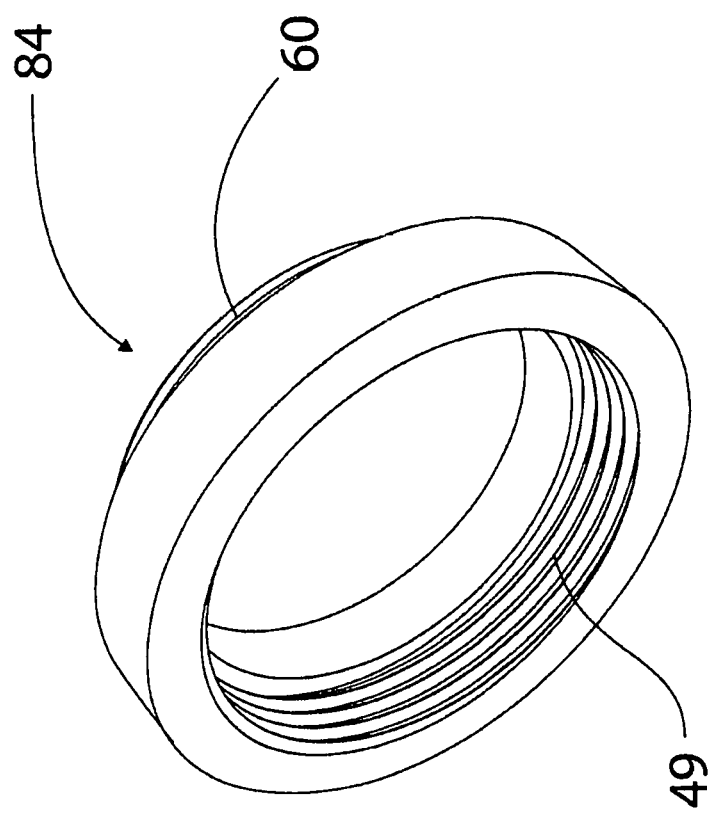
FIG. 10 is a perspective view of an M/C-mount adapter flange.
Figure 14:
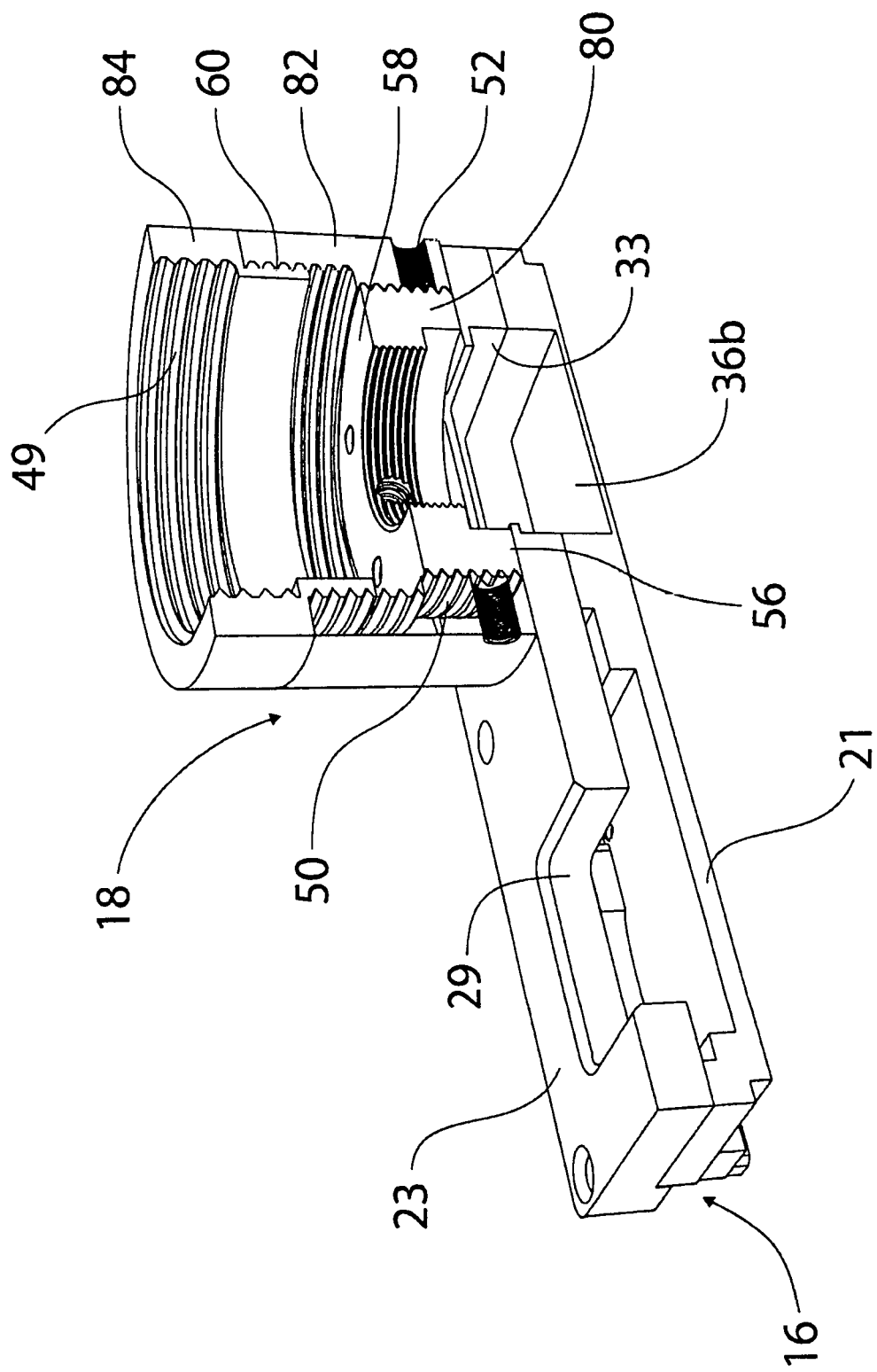
FIG. 14 is a perspective cross sectional view of the lens mount assembly mounted to the front plate assembly sectioned along the line A-A shown in FIG. 8.
Figure 15:
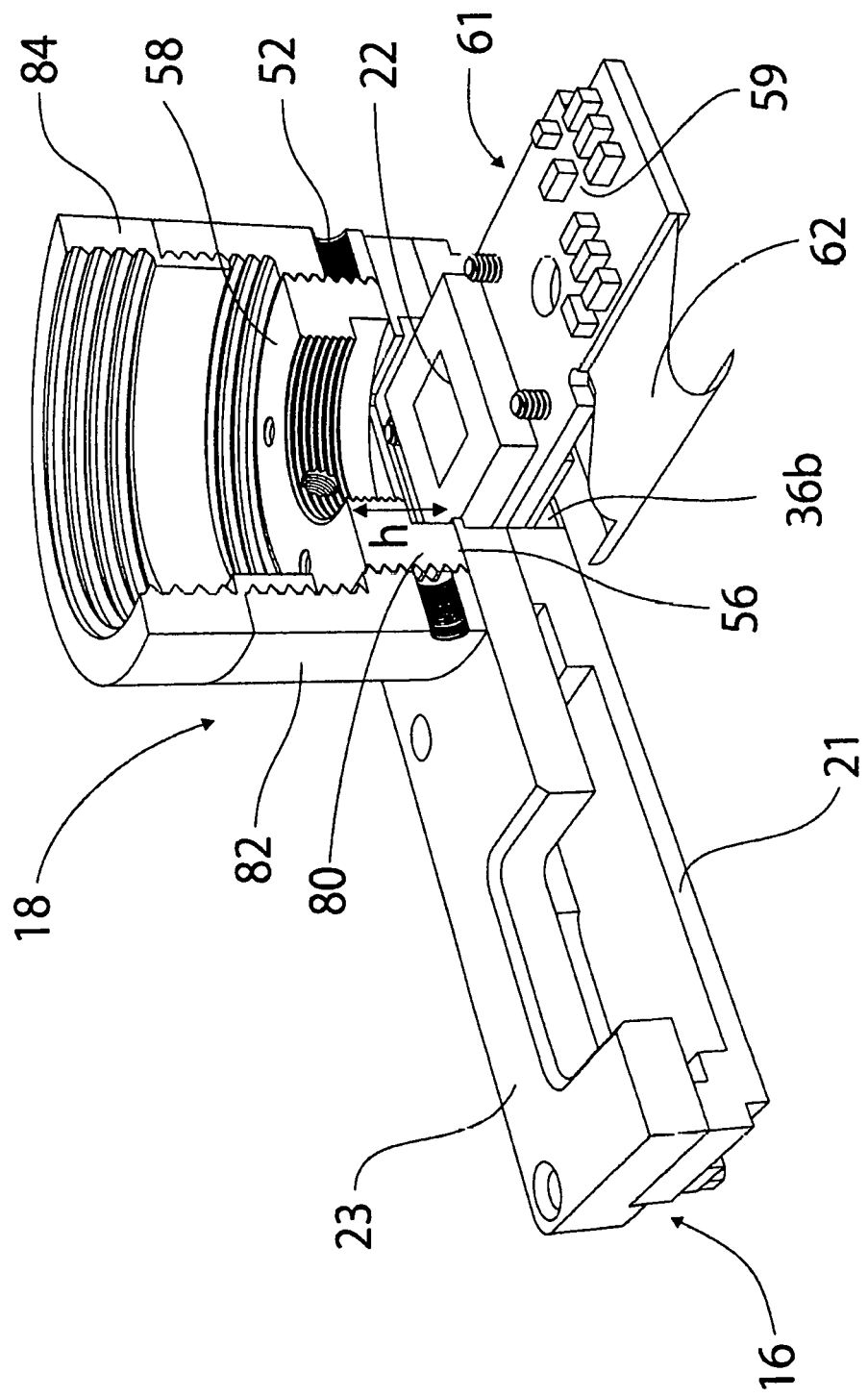
FIG. 15 is a perspective cross sectional view of the lens mount assembly mounted to the front plate assembly sectioned along the line A-A shown in FIG. 8, and shown additionally with the image sensor assembly oriented in an operative position relative to the front plate assembly and the lens mount assembly.

Optionally, one may mount additional lens types using the lens mount assembly 18. For this option, one or more lens adapters or adapters and spacers are attached to flange 80. FIGS. 8, 14, and 15 shows an internally-threaded CS adapter 82 that threads onto M12 flange 80 to mount a CS lens. FIGS. 8 and 10 further show a spacer 84 which serves as an additional component for mounting a C-lens. As best seen in FIG. 10, spacer 84 comprises an internally threaded segment 49 for threading onto flange 80 and an externally threaded segment 60 for receiving a threaded C-mount lens. When using adapter 82, set screw 54 may be used to lock adapter 82 to flange 80 when the lens is precisely spaced relative to sensor 22 for optimal focusing.

As best seen in FIGS. 8 and 13, a tripod mount 92 may be secured to front plate assembly 16, for example with a screw threaded attachment. Tripod mount 92 comprises a bracket configured to securely fasten to front plate assembly 16, with a lower face having a threaded aperture 86 for attachment to a conventional camera tripod (see FIG. 8).

It will be seen that kit 14 is configured to mount to specific make and model of existing digital camera and also to incorporate several components from the existing camera into front plate assembly 16, such as the image sensor and display assembly of the original camera. Alternatively, the kit may be supplied with such components so as to simplify installation. For example, the kit may be supplied with a pre-assembled front plate assembly 16 with the image sensor and other components, configured for a specific camera make and model, wherein installation is simplified.

As a further embodiment, the present invention comprises a digital camera component that is serves as an interface between a camera lens and image processing and storing components. In this embodiment, the invention is not necessarily a retrofit kit for an existing digital camera, but rather a digital camera component that can be mounted to a camera lens and transmit digital signals to a downstream signal processing component. According to this embodiment, the invention consists of assembled front plate assembly 16, including lens mount flange 80 and optionally additional lens mount assembly 18, image sensor assembly 61, LED/LCD assembly 66 and a power source such as a battery. In this embodiment, the separable two layer sandwich construction of front plate assembly 16, composed of base 21 and cover plate 23, may be replaced with a monolithic assembly or other configuration. The digital camera component further comprises a wireless or wired signal transmission system for transmitting digital signals from the image sensor to a remote signal processing and storage component, and optionally for transmitting signals from said remote component to the LED/LCD assembly.

In this further embodiment, it will be appreciated that the digital camera component allows for practically limitless interchangeability of a variety of different types of camera lenses to be mounted and unmounted to front plate assembly 16. The lens mount assembly 18 comprises adapter 82 which is configured to mount an interchangeable camera lens. Alternatively, lens mount assembly 18 comprises adapter 82 releasably coupled to the spacer 84 that may directly mount a different type of interchangeable camera lens. In any case, whether or not lens mount assembly 18 is incorporated into the digital camera component, it will be appreciated that the distance between the camera lens relative to optical image sensor 22 is spaced by a distance that focuses the image from the lens onto the image sensor 22.

The scope of the invention should not be limited by the preferred embodiments set forth in the examples but should be given the broadest interpretation consistent with the specification as a whole. The claims are not to be limited to the preferred or exemplified embodiments of the invention.

The invention claimed is:

1. A kit for converting a selected non-interchangeable lens digital camera to mount interchangeable camera lenses, wherein the camera comprises a camera body comprising a housing, a removable front cover, and an image processing system for electronically processing and storing digital photographic images from a digital sensor, said kit comprising:

a front plate assembly configured to mount to said housing to replace the front cover of the camera body, said front plate assembly configured to retain a digital image sensor wherein electrical connectors from the image sensor may be routed to the interior of the camera body for the transmission of electrical signals from the image sensor to said image processing electronic components; wherein said front plate assembly is configured to retain at least one additional camera component selected from a digital image display, a power control member, and a light emitting member; and a lens mount for releasably mounting an interchangeable camera lens to said front plate assembly, said lens mount configured to mount at least one type of interchangeable camera lens, wherein the lens mount is configured to position the camera lens to focus an image from the camera lens on the image sensor.

2. The kit of claim 1 wherein the lens mount comprises a flange protruding from the front plate assembly configured to mate with a lens mount of said camera lens.

3. The kit of claim 2 wherein said flange comprises an anti-rotation member to prevent rotation of the lens on the flange to secure the lens to the flange at a selected position on the flange.

4. The kit of claim 1 wherein said lens mount comprises a first mounting member configured to mount a first selected lens type to the front plate assembly, and a first adapter configured to mount to the first mounting member and to a second selected lens type, wherein the first and second lens types comprise different lens mounts.

5. The kit of claim 4 wherein said first and second lens types are selected from M12, C and CS mounts.

6. The kit of claim 1 wherein said front plate assembly comprises a base plate and a cover plate, comprising at least one recess between the base and cover plates configured to retain the digital image sensor, said base and cover plates being separable to insert the sensor for assembly of said kit.

7. The kit of claim 1 further comprising an electrical connector having first and second ends configured for attachment to the image sensor and image processing electronic components respectively, said connector being configured to extend from the front plate assembly into said camera body.

8. The kit of claim 7 wherein said front plate assembly includes an opening for said connector to permit the connector to pass between the image sensor and the electronic components.

9. The kit of claim 1 wherein the lens mount contacts said front plate assembly at a front surface of the front plate assembly and said front plate assembly is configured to retain the digital image sensor in a position which is substantially flush or slightly recessed from said front surface.

10. The kit of claim 1 wherein said front plate assembly covers a front portion of the camera body when installed thereto wherein the sides and back surfaces of the camera body are uncovered.

11. A method for converting a digital camera having a non-interchangeable lens into an interchangeable lens camera, the digital camera having camera body comprising face plate, lens and image sensor, the method comprising the steps of:

removing the face plate, lens and image sensor from the camera body;

securing a front plate assembly to the camera body wherein the front plate assembly comprises a digital image sensor and a lens mount for releasably mounting an interchangeable camera lens to said front plate assembly, said lens mount configured to mount at least one type of camera lens, wherein the lens mount is configured to position the camera lens to focus an image from the lens on the image sensor; wherein said front plate assembly is configured to retain at least one additional camera component selected from a digital image display, a power control member, and a light emitting member;

routing electrical connectors from the digital image sensor to the interior of the camera body for the transmission of electrical signals from the image sensor to said electronic components, and connecting said electrical connectors to digital image processing components of said camera.

12. The method of claim 11 wherein said front plate assembly comprises a base plate and a cover plate, wherein at least one recess between the base and cover plates retains the digital image sensor, said base and cover plates being separable to insert the sensor for assembly of said kit.

13. The method of claim 11 further comprising attaching an electrical connector having first and second ends to the image sensor and image processing electronic components respectively, said connector being configured to extend from the front plate assembly into said body.

14. The method of claim 11 wherein the lens mount contacts said front plate assembly at a front surface of the front plate assembly and said digital image sensor is secured to the front plate assembly in a position which is substantially flush or slightly recessed from said front surface.

15. The method of claim 11 wherein said front plate assembly is secured to the camera body to cover a front portion of the camera body wherein the sides and back surfaces of the camera body are uncovered.

16. An assembly for attaching to a camera lens to digitally capture images, comprising:

a digital image sensor;

a support comprising a surface having a recess therein configured to secure the digital image sensor within the recess in a position whereby an image from the camera lens is focused on the sensor and the sensor is flush with the surface or slightly recessed therefrom; wherein said support is configured to retain the digital image sensor; wherein support is configured to retain at least one additional camera component selected from a digital image display, a power control member, and a light emitting member;

an electrical connector to transmit electrical signals from the image sensor to an electronic circuit for processing of said signals into a stored digital image and optionally controlling said image sensor; and a lens mount for attachment to the support and configured to releasably mount the camera lens to said lens mount, said lens mount configured to mount least one type of camera lens, wherein the lens mount is configured to position the camera lens to focus an image from the lens on the image sensor.

17. The assembly of claim 16 wherein the lens mount comprises a flange protruding from the support configured to mate with a lens mount of said camera lens, said flange comprising an anti-rotation member to prevent rotation of the lens on the flange to secure the lens to the flange at a selected position on the flange.

18. The assembly of claim 16 wherein said lens mount comprises a first mounting member configured to mount a first selected lens type to the support, a first adapter configured to mount to the first mounting member and to a second selected lens type, wherein the first and second lens types comprise different lens mounts.

19. The assembly of claim 18 wherein said first and second lens types are selected from M12, C and CS mounts.

20. The assembly of claim 16 wherein said support comprises a base plate and a cover plate, comprising at least one recess between the base and cover plates configured to retain the digital image sensor, said base and cover plates being separable to insert the sensor for assembly of said assembly.

21. The assembly of claim 16 wherein said support includes an opening for said connector to permit the electrical connector to pass between the image sensor and the electronic circuit.

22. The kit of claim 4 further comprising a second adapter adapted to mount to the first adapter and to a third selected lens type, wherein the third lens type comprises a different lens mount from the lens mounts of the first and second lenses.

23. The assembly of claim 18 further comprising a second adapter adapted to mount to the first adapter and to a third selected lens type, wherein the third lens type comprises a different lens mount from the lens mounts of the first and second lenses.

* * * * *